United States Patent [19]
Muster et al.

[11] Patent Number: 6,128,985
[45] Date of Patent: Oct. 10, 2000

[54] MACHINE TOOL

[75] Inventors: Jacques Muster; François Roquier, both of Tramelan, Switzerland

[73] Assignee: Kummer Fre'res SA Fabrique de Machines, Tramelan, Switzerland

[21] Appl. No.: 08/837,798

[22] Filed: Apr. 22, 1997

[30] Foreign Application Priority Data

May 10, 1996 [EP] European Pat. Off. .............. 96810298

[51] Int. Cl.⁷ .................................................. B23B 41/00
[52] U.S. Cl. .................................. 82/1.4; 82/131; 82/165; 82/63; 82/903
[58] Field of Search ................................. 82/1.4, 11, 131, 82/163, 165, 903, 63; 279/4.12, 4.04, 43, 50, 57, 125, 132; 408/56, 103, 153, 158, 154, 181, 143, 147

[56] References Cited

U.S. PATENT DOCUMENTS

| | | | |
|---|---|---|---|
| Re. 32,211 | 7/1986 | Jerue et al. ................................. | 82/1.2 |
| 3,880,025 | 4/1975 | Kralowetz et al. ........................... | 82/9 |
| 3,881,735 | 5/1975 | Joyce .......................................... | 279/6 |
| 4,040,315 | 8/1977 | Bellingham ............................... | 82/63 X |
| 4,617,846 | 10/1986 | Horsch ...................................... | 82/1.4 |
| 4,895,058 | 1/1990 | Watson et al. ............................. | 279/6 |
| 4,899,628 | 2/1990 | Seichter et al. ........................... | 82/1.5 |
| 4,966,375 | 10/1990 | Rohm et al. .............................. | 279/6 |
| 5,197,836 | 3/1993 | Crivellin . | |
| 5,251,511 | 10/1993 | Muendlein et al. ....................... | 82/1.2 |
| 5,396,821 | 3/1995 | Okumura et al. ......................... | 82/1.3 |
| 5,544,556 | 8/1996 | Jones . | |
| 5,711,196 | 1/1998 | Reid .......................................... | 279/6 |

FOREIGN PATENT DOCUMENTS

| | | |
|---|---|---|
| 0 486 992 | 5/1992 | European Pat. Off. . |
| 33 20 129 | 10/1984 | Germany . |
| 195 11 420 | 10/1995 | Germany . |
| 53-20632 | 6/1978 | Japan . |
| 59-66514 U | 5/1984 | Japan . |
| 2-43112 U | 3/1990 | Japan . |
| 4-223815 | 8/1992 | Japan . |
| 2-5-6001 | 2/1993 | Japan . |
| 5-9849 U | 2/1993 | Japan . |
| 5-84605 | 4/1993 | Japan . |
| 6-335803 | 12/1994 | Japan . |
| 7-60516 | 3/1995 | Japan . |
| 1 244 703 | 9/1971 | United Kingdom . |

Primary Examiner—Henry W. H. Tsai
Attorney, Agent, or Firm—Oliff & Berridge, PLC

[57] ABSTRACT

The machine tool includes a workpiece-holding spindle consisting of a slide capable of being moved along the X-axis perpendicular to the main axis of rotation of the machine. The slide is moved via a tie-rod, actuated at one end by a numerical axis and having at the other end an oblique projection fitted in an oblique hole in the slide. Movement of the tie-rod along the Z-axis therefore causes movement of the slide, hence of the workpiece, along the X-axis. Provision is made for counterbalancing the rotating spindle. The machine tool is thus capable of machining parts having eccentric shoulders.

16 Claims, 4 Drawing Sheets

//6,128,985

MACHINE TOOL

BACKGROUND OF THE INVENTION

This invention relates to machine tools, and more particularly to a lathe of the type having a spindle rotating about a main axis, this spindle comprising a workpiece holder or a tool holder capable of being thrown off center in relation to the axis of rotation of the spindle.

DESCRIPTION OF RELATED ART

A machine tool working rotatingly can generally machine only workpieces having cylindrical or conical shoulders which are concentric and coaxial, i.e., the axes of rotation of the various shoulders, or seatings, are all aligned with a main longitudinal axis. When it is desired to machine a workpiece provided with one or more shoulders or seatings which are eccentric with respect to one another, it is necessary to stop the machine between the machining of the different shoulders, shift the workpiece-holder spindle or the tool-holder spindle by a certain amount, and resume machining for the following eccentric shoulder. This necessitates numerous handling steps, possibly unchucking and rechucking of the workpiece, which operations generally cannot be carried out, or are very difficult to carry out, by automatic means. Such handling has a negative influence on the machining precision, as well as on the machining rate.

U.S. Pat. No. 5,197,836 describes a machining station on which the axis of rotation of the spindle can be thrown off center in relation to the frame of the machine. This machine tool could not easily machine workpieces such as described above.

U.K. Patent No. 1,244,703 shows a device in which the movement of the tool holder in relation to the axis of rotation of the spindle takes place solely on a curve; thus, it is not possible to reach just any point on the plane perpendicular to the axis of rotation of the spindle.

U.S. Pat. No. 5,544,556 describes a lathe in which the spindle is capable of being thrown off center by a fixed amount with respect to the main machining axis. Such a machine can therefore machine only a workpiece having a single off-center shoulder. Moreover, the off-centering is fixed and is therefore neither adjustable nor programmable.

SUMMARY OF THE INVENTION

It is an object of this invention to provide an improved machine tool free of the mentioned drawbacks of prior art machines.

Another object of the invention is to provide a machine tool having a spindle equipped with a tool holder or a workpiece holder capable of being thrown off center by any amount between given limits, in a plane perpendicular to the axis of rotation of the spindle.

A further object of the invention is to provide such a machine tool equipped with means to compensate for the imbalance created by the off-centering of the workpiece holder or tool holder.

To this end, in the machine tool according to the present invention, of the type initially mentioned, the off-centering can be obtained continuously and take any desired co-ordinates (Xi, Yi) in a plane perpendicular to the axis of rotation of the spindle.

BRIEF DESCRIPTION OF THE DRAWINGS

In a particular embodiment of the invention, off-centering can take place along an axis perpendicular to the axis of rotation of the spindle.

Other objects and advantages of the invention will become apparent from the following detailed description of a preferred embodiment thereof, taken in conjunction with the accompanying drawings, in which.

DETAILED DESCRIPTION OF THE INVENTION

Figure 1B:
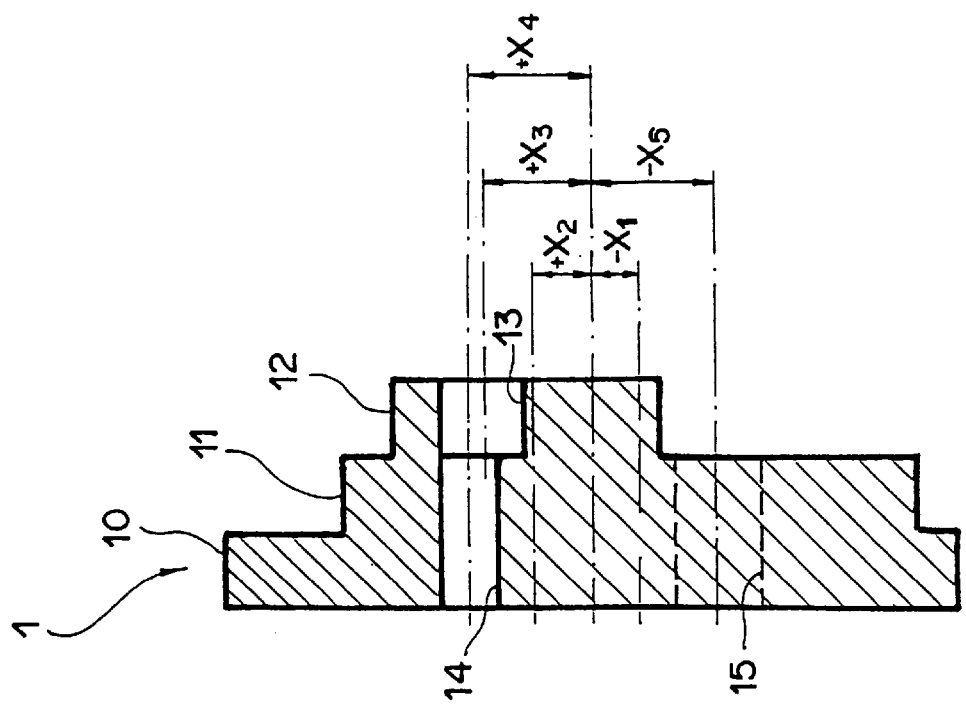
FIG. 1 is an end view accompanied by a sectional view of a typical workpiece which can be produced by a lathe having off-centerable chucking according to the invention.
Figure 1A:
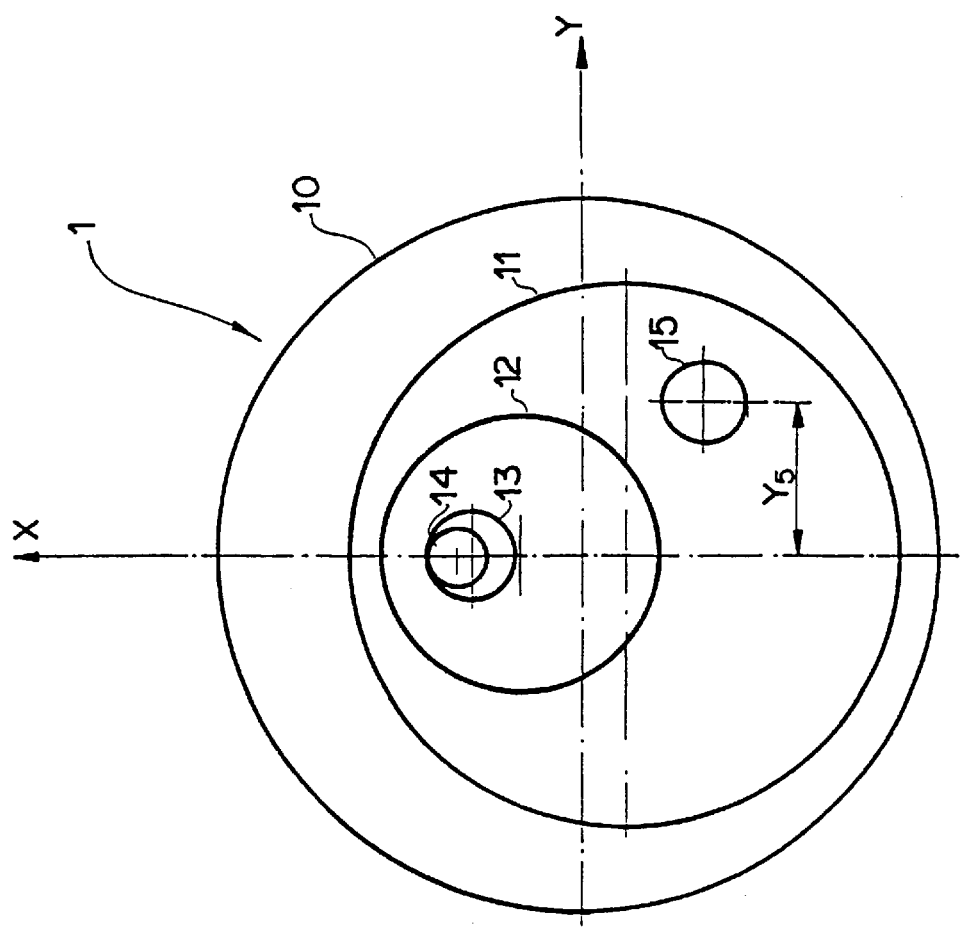

The workpiece 1 in FIG. 1 includes a first cylindrical shoulder 10 of a certain diameter; on first shoulder 10 there is a second cylindrical shoulder 11, the diameter of which is less than than of shoulder 10, and the longitudinal axis of which is shifted by an amount −X1 in relation to the longitudinal axis of shoulder 10. A third shoulder 12 is machined on the preceding shoulder 11, it, too, having a smaller diameter and a shift of +X2 in relation to the longitudinal axis of the first shoulder 10. The workpiece 1 may further comprise a bore 13, the longitudinal axis of which is also shifted by an amount +X3, as well as a through bore 14, the longitudinal axis of which is shifted by +X4. The workpiece 1 shown here by way of example is produced solely by turning, reaming, and drilling operations; but it should be understood that all the other machining operations which can be performed on a lathe may also be carried out, e.g., the machining of cones, grooves, etc., having their longitudinal axis shifted in relation to the X-axis. It will also be noted that the workpiece 1 has a bore 15, the longitudinal axis of which is shifted by −X5 and +Y5 in relation to the longitudinal axis of the first shoulder 10; shifts of this type may be carried out by a lathe with off-centerable chucking according to a more general embodiment of the invention.

Figure 2:
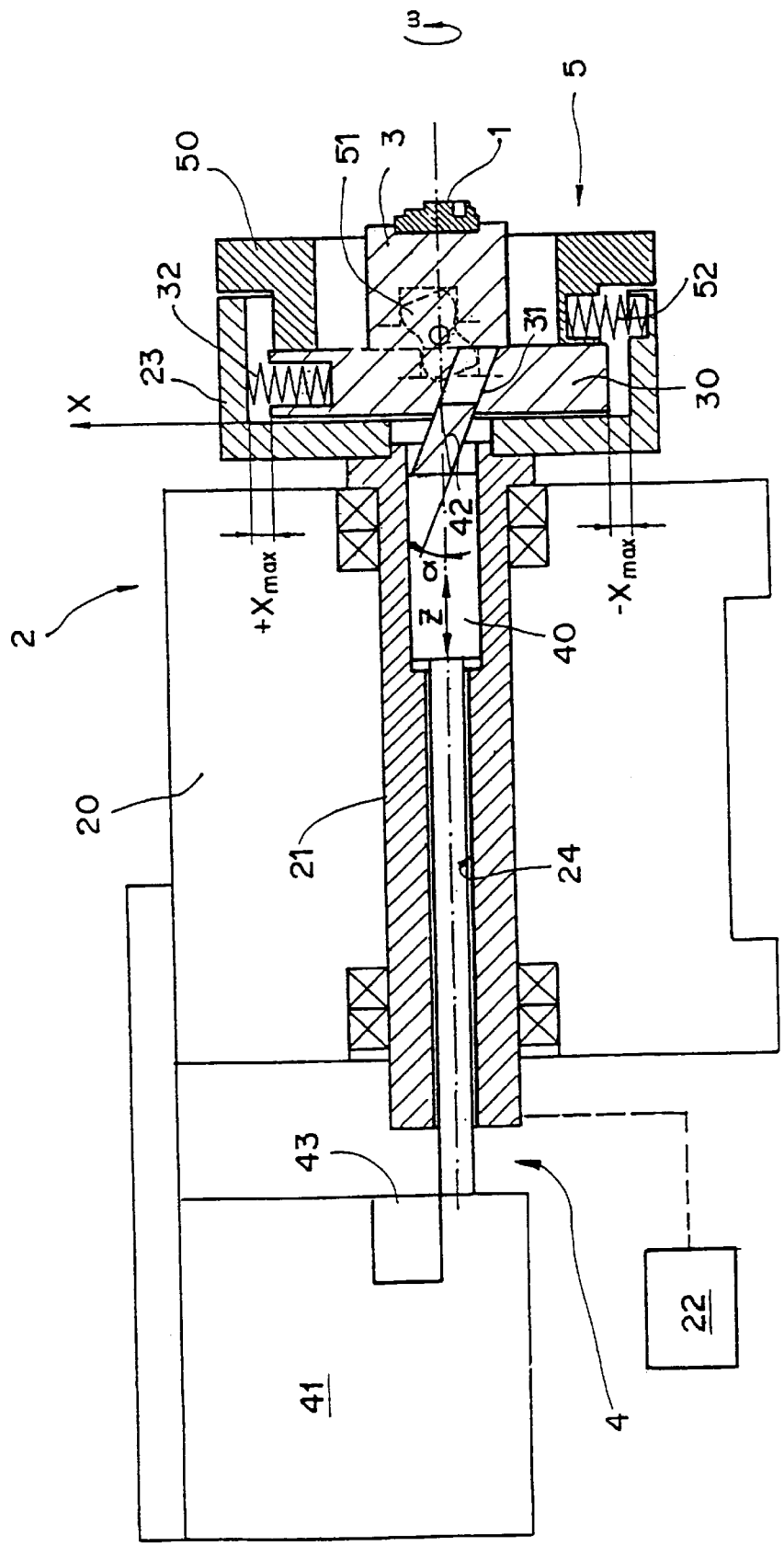
FIG. 2 is a diagrammatic side view, partially in section, of such a lathe.

FIG. 2 shows a basic diagram of a machine tool 2, particularly of a lathe having off-centerable chucking, certain design details being illustrated in the following drawing figures. Lathe 2, only part of which is shown, includes especially a headstock 20 in which a shaft 21, driven by a motor 22, rotates a workpiece-holder spindle 23. In the present case, spindle 23 is substantially bell-shaped, opening toward the right as viewed in the drawing, i.e., toward the workpiece 1 to be machined. Within spindle 23, a slide 3 supporting workpiece 1 is capable of moving along the X-axis. For this purpose, slide 3 preferably comprises a bottom portion 30 pierced by an oblique hole 31. The movement of slide 3 is controlled by movement-control means 4. These means 4 may consist of a tie-rod 40 capable of sliding longitudinally within a bore 24 in shaft 21, the movement of tie-rod 40 being controlled by suitable means, preferably a numerical control system 41 connected to headstock 20, on the one hand, and on the other hand to one end of tie-rod 40. The other end of tie-rod 40 includes an oblique projection 42 forming an angle α with the longitudinal axis of the lathe, projection 42 fitting slidingly in hole 31. Thus, when numerical axis 41 causes tie-rod 40 to move in one direction or the other of the Z-axis, the sliding of oblique projection 42 in oblique hole 31 causes slide 3 to move along the X-axis, i.e., causes workpiece 1 to be thrown off center in relation to the main longitudinal axis of the lathe. For a desired off-centering of X1, tie-rod 40 must be moved by an amount Zi=Xi/tan α. A sensor 43 allows the extent of the movement Zi to be monitored according to the desired off-centering Xi. A first spring 32, disposed between spindle 23 and slide 3, allows the position of the latter to be stabilized. The total possible movement of slide 3 in relation to spindle 23 is determined by the difference between the inside diameter of the bell of spindle 23 and the outside diameter of slide 3. In order to be able to control the movement of slide 3 over a maximum distance, tie-rod 40 must therefore be capable of moving by a distance equal to this difference in diameters divided by tan α, the bottom portion 30 of slide 3 having to be so dimensioned that oblique projection 42 remains permanently in oblique hole 31.

Since slide 3 and workpiece 1 have a mass M, off-centering of these elements by an amount Xi causes an imbalance proportional to M*Xi which may be transferred especially to shaft 21 and bring about premature wear and tear on the bearings supporting it. In order to compensate for this imbalance, provision may be made for counterbalancing means 5, which may be composed of a solid part, here a ring 50 having a certain mass and likewise being able to move along the X-axis, but in the direction opposite to the movement of slide 3. A set of levers 51 makes possible this relative displacement of ring 50 with respect to slide 3. The mass of ring 50 is preferably adjusted to be equivalent to the aforementioned value M, e.g., by adding screws in threads provided for that purpose in ring 50, and the set of levers 51 is so determined as to bring about a movement of ring 50 to the same extent as that effected by slide 3, but in the opposite direction. It would also be possible to provide for the mass of ring 50 to be different from the mass M of slide 3 and of the workpiece; in this case, the controlled movement of ring 50 is calculated so that the product of the mass of ring 50 times its movement is equal to the product of mass M times the movement of slide 3.

A second spring 52 stabilizes the position of ring 50. The off-centering of slide 3 and of ring 50 creates centrifugal forces which are also transferred to shaft 21. In order to limit these forces, the constants of springs 32 and 52 are so chosen that for a given off-centering and a given speed of rotation of spindle 23, the force exerted by each spring is slightly greater than the centrifugal force exerted by the element it is pushing against. In this way, the forces exerted on shaft 21 and tie-rod 40 are minimized. Since the system for movement control of slide 3 rotates with spindle 23, it may be advantageous to dispose the movement control of tie-rod 40—here, for instance, in the form of numerical axis 41—at the other end of part 40 in order to ensure reliable transmission of the signal and of the energy necessary for this movement control. In order to avoid variations in the length of tie-rod 40 as a function of temperature fluctuations, creating off-centering errors, tie-rod 40 is preferably made of a material having a very low heat-expansion coefficient, such as invar, for example. A lathe with off-centerable chucking as described above allows eccentric-axis turning operations to be carried out, the axes of these operations being aligned on the X-axis. In a more general embodiment, e.g., by allowing slide 3 to pivot in relation to spindle 23, this pivoting movement being controlled by corresponding pivoting of tie-rod 40, it becomes possible to control off-centering according to the X-axis and to the pivoting angle, i.e., by changing the co-ordinates, according to the X-axis and the Y-axis, respectively.

Figure 3:
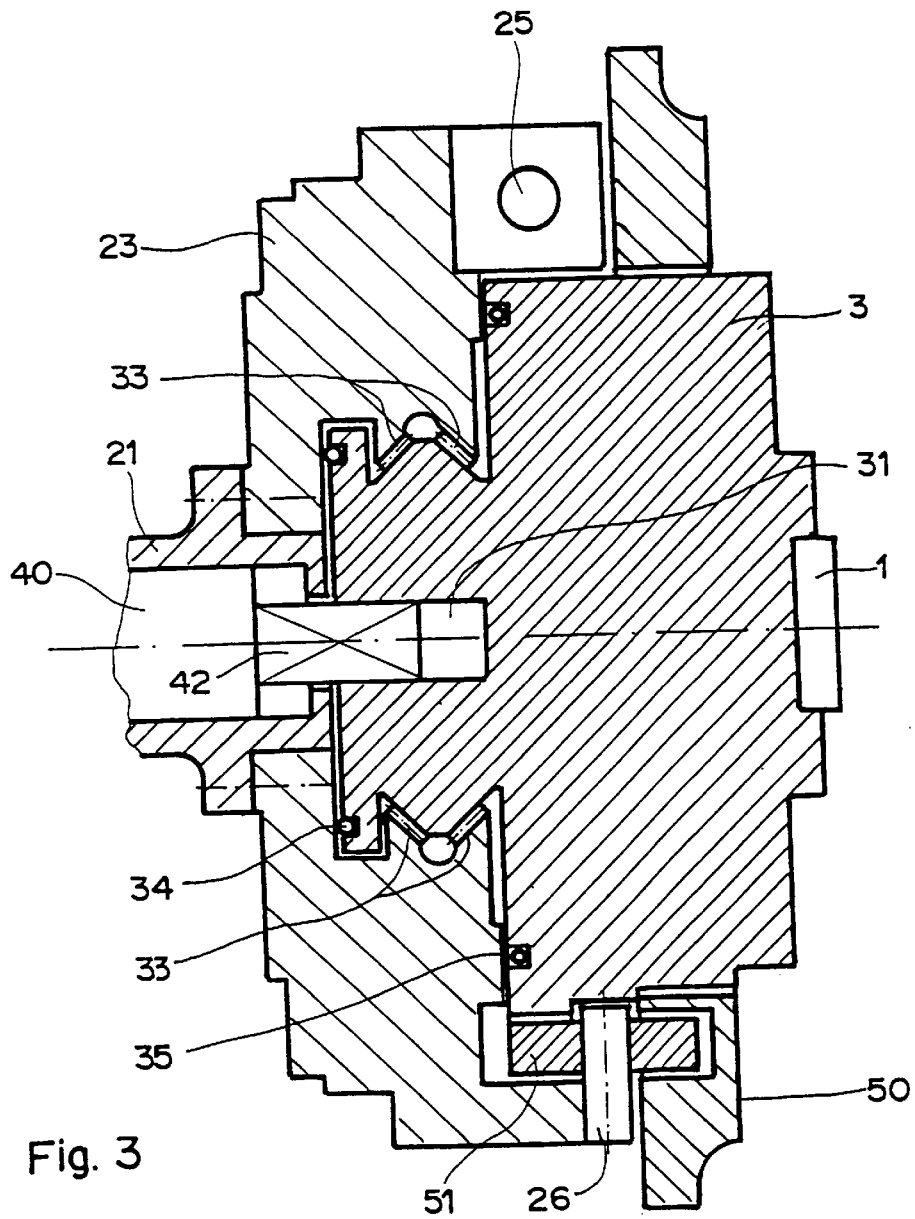
FIG. 3 is a top section taken on a plane perpendicular to the off-centering axis of the spindle of such a lathe.
Figure 4:
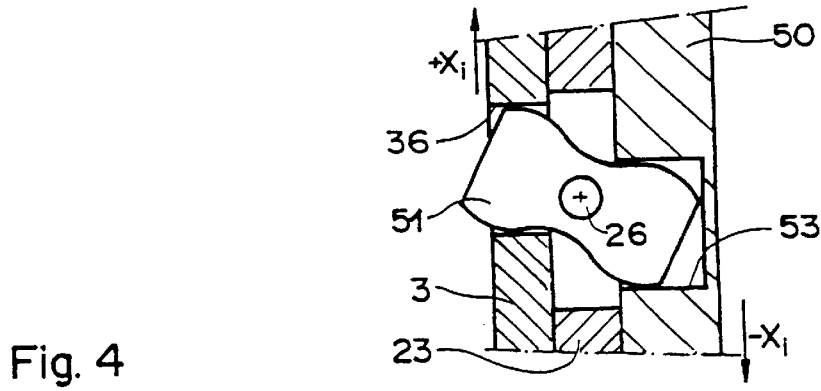
FIG. 4 is a detail side view, partially in section, illustrating a possible design modification.

Turning to FIG. 3, a section taken on a plane perpendicular to off-centering axis X, certain details of spindle 23 and of the connection joint of slide 3 and ring 50 may be seen. Not all the design details are shown in order not to clutter the drawing. Shaft 21 rotates spindle 23. Tie-rod 40 is capable of moving along the Z-axis, oblique projection 42 fitting into oblique hole 31 of slide 3, as previously indicated. Two pairs of linear needle bearings 33 allow slide 3 to slide in relation to spindle 23. Gaskets 34, 35 make this guidance fluid-tight in order to protect it from splashes of cutting oil and from turnings. By means of bearings 33, therefore, faultless guidance of slide 3 along the X-axis is obtained in relation to spindle 23. Ring 50 can slide along two cylindrical rods 25 disposed on each side of spindle 23. Only one of the rods 25 is shown at the right of the drawing. Seen at the left of the drawing, on the other hand, is one of the levers 51, capable of pivoting about a pin 26 fixed to spindle 23. The operation of levers 51 is shown in FIG. 4. There slide 3 is seen to comprise an opening 36 facing lever 51, whereas ring 50 comprises a corresponding opening 53. A movement of slide 3 by an amount Xi, in one direction or the other, causes lever 51 to pivot about pin 26 and consequently moves ring 50 by a corresponding amount in the opposite direction. In the drawing, slide 3 has been moved by the maximum possible amount, having also caused ring 50 to move as far as possible. It would also be possible provide that the movement transmission ratio is not 1:1, as in the drawing, but rather inversely proportional to the masses of the elements to be moved. As indicated previously, ring 50 slides along rods 25.

Figure 5:
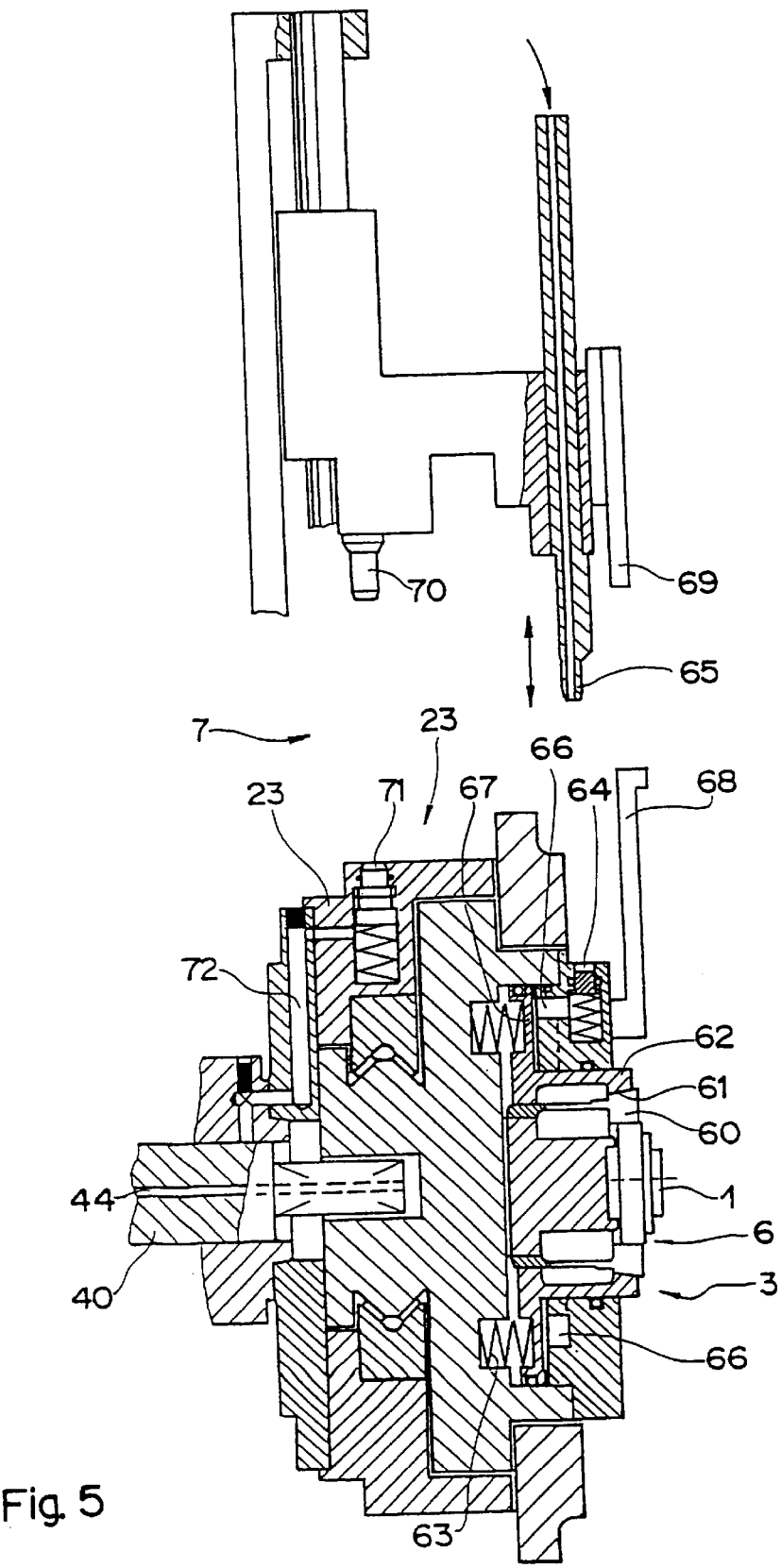
FIG. 5 is a sectional view of a top device for chucking the workpiece to be machined.

FIG. 5 shows part of slide 3 in section, illustrating a device 6 for chucking P 1. The latter is held by a conventional clamp 60 acting as a spring, the bottom of workpiece 1 resting against a stop. A portion of the outside surface of clamp 60 includes a cone 61. A gripping part 62, having a conical inside surface, is movable axially and either grips or releases clamp 60, depending upon its axial position. Gripping part 62 is held toward the right of the drawing, in the position which grips clamp 60, by means of a plurality of springs 63 regularly disposed in a circle about the main longitudinal axis of the lathe. To release clamp 60 in order to insert or remove a workpiece 1, the spindle, via slide 3, is brought into a certain angular position such that an air inlet 64 is disposed opposite a compressed-air injection nozzle 65 disposed on a slideway fixed on the one hand to headstock 20 and capable of allowing nozzle 65 to move toward inlet 64. Air inlet 64 communicates with an air chamber 66 likewise disposed in a circle about the main longitudinal axis of the lathe. Air chamber 66 is disposed on one side of a wall 67 acting as a piston, the other side of which rests against springs 63, wall 67 forming part of gripping part 62. When the spindle is stopped in the required position, nozzle 65 is lowered, and the end of it is inserted in inlet 64; compressed air is then injected, which spreads though air chamber 66 and pushes wall 67, and hence part 62, toward the rear, opposing the force exerted by springs 63, thus freeing clamp 60 and workpiece 1. Inlet 64 is preferably provided with a spring valve which can be actuated by the end of nozzle 65, thus preventing machining liquid or turnings from getting into the air circuit of fixing device 6. A device for checking the gripping or release of clamp 60 may also be mounted, e.g., beside nozzle 65. This device is made up of a radial arm 68, fixed to gripping part 62, and of a sensor 69, e.g., an inductive sensor, which approaches radial arm 68 upon the approach of nozzle 65. By detecting the advanced or retracted position of arm 68, hence of gripping part 62, and transmitting this information to a control unit (not shown), the machining program is informed of the gripped or released status of clamp 60. Such a chucking device is particularly well adapted to the lathe with off-centerable chucking previously described, but may also easily be installed on a conventional machine tool or lathe.

A lubrication device 7 is preferably made up as shown in FIG. 5; it is composed of a nozzle 70, disposed on the same support as nozzle 65 or on another support and lowered at the same time as nozzle 65. A lubricant inlet 71 is disposed on spindle 23, facing nozzle 70, and is connected by ducts 72 supplying the lubricant to tie-rod 40, whence it is distributed to the parts to be lubricated. Thus, lubrication is completed solely upon stopping of the machine at the time of changing the workpiece. In this way, tie-rod 40 and its oblique portion 42 are reliably lubricated, permitting the off-centering of slide 3 to be controlled when spindle 23 is rotating. As may be seen in this same drawing figure, a duct 44 passes longitudinally through tie-rod 40 and oblique portion 42 in order to supply a cutting liquid which is driven out via ducts provided for that purpose through slide 3 and gripping device 6 in order to keep machining turnings from getting into the device and blocking the movements of slide 3 and ring 50.

Those skilled in the art will be able to adapt the preceding description to a machine tool other than a single-spindle lathe as described. Thus, the means described above make possible the production of a machine tool, especially a lathe, the spindle of which can be continuously thrown off center by any desired amount, the amount of off-centering being controllable by numerical calculating means suitable for the machine.

What is claimed is:

1. Machine tool, comprising:
   a spindle rotating about an axis of rotation, said spindle including a workpiece holder or a tool holder capable of being thrown off center in relation to the axis of rotation of said spindle, the off-centering being obtained continuously and comprising any desired co-ordinate along an axis perpendicular to said axis of rotation of the spindle, the workpiece holder or the tool holder comprising a slide bearing a workpiece to be machined or a machining tool, said slide being capable of moving along the axis perpendicular to said axis of rotation of the spindle, a first spring being disposed between the spindle and the slide, the constant of said spring being so chosen that its force of pressure is greater than the centrifugal force exerted by the off-center slide.

2. Machine tool according to claim 1, the slide being controlled in movement by means of a tie-rod disposed in a longitudinal seating of a driving shaft of the spindle, said tie-rod comprising at the end thereof nearest said slide an oblique projection fitting in and cooperating with an oblique hole contrived in a bottom part of the slide, an axial movement of said tie-rod bringing about a radial movement of the slide.

3. Machine tool according to claim 2, the other end of the tie-rod being driven with axial movement by means of numerical control system, the amount of movement of the tie-rod being checked by a sensor.

4. Machine tool according to claim 2, the tie-rod being further capable of being set rotating in said longitudinal seating of the driving shaft of the spindle, permitting the off-centering to be obtained for each co-ordinates in a plane perpendicular to the axis of rotation of the spindle.

5. Machine tool according to claim 2, the tie-rod being made of a material having a low coefficient of heat expansion.

6. Machine tool according to claim 1, the off-centering of the slide, hence of the workpiece to be machined, being controlled when the spindle (23) is rotating.

7. Machine tool according to claim 1, further comprising counterbalancing means capable of compensating of the imbalance created by the off-centering of the slide and the workpiece to be machined.

8. Machine tool according to claim 7, the means for counterbalancing the imbalance comprising a ring capable of moving along the same axis as the slide but in the opposite direction.

9. Machine tool according to claim 8, the movement of the ring being controlled by at least one lever pivoting about a pin fixed to the spindle, a first end of said lever fitting into an opening contrived in the slide, the other end of said lever fitting in another opening contrived in the ring.

10. Machine tool according to claim 8, the mass of the ring being adjustable so as to equal the mass of the slide as well as of the workpiece to be machined, the amount of the movement in one direction of the ring being equal and opposite to the amount of the off-centering of the slide.

11. Machine tool according to claim 8, a second spring being disposed between the spindle and the ring, the constant of said spring being so chosen that its force of pressure is greater than the centrifugal force exerted by the off-centering ring.

12. Machine tool according to claim 1, a workpiece to be machined being held in a circular spring clamp mounted on a slide and comprising a conical outside surface portion, a gripping part movable axially surrounding said clamp and comprising a conical surface co-operating with the conical surface of the clamp for its gripping, the gripping of the gripping part against the clamp being obtained by means of a plurality of springs, the release being obtained by means of compressed air coming from an injection nozzle radially displaceable on the headstock of the machine tool, said nozzle fitting when the spindle is not rotating, into an air inlet disposed on the slide in order to inject pressurized air into an air chamber disposed on a wall of said gripping part, the pressurized air opposing the force exerted by the springs in order to release the clamp and free the workpiece.

13. Machine tool according to claim 12, further comprising means for checking the gripped or released condition of the chucking clamp, made up of a radial arm fixed to said camp and a sensor for detecting the position of said radial arm.

14. Machine tool according to claim 1, further comprising means for lubricating a tie-rod made up of a lubricant-injection nozzle, radially displaceable on a headstock of the machine tool, said nozzle fitting, when the spindle is not rotating, into a lubricant inlet disposed on the spindle in order to inject lubricant into a duct connected to a seating of the tie-rod.

15. Machine tool according to claim 1, a tie-rod and an oblique projection comprising a duct for the passage of a machining liquid.

16. Machine tool according to claim 1, further comprising a machining lathe.

* * * * *

UNITED STATES PATENT AND TRADEMARK OFFICE
CERTIFICATE OF CORRECTION

PATENT NO.    : 6,128,985
DATED         : October 10, 2000
INVENTOR(S)   : Jacques Muster et al.

It is certified that error appears in the above-identified patent and that said Letters Patent is hereby corrected as shown below:

This certificate supersedes Certificate of Correction issued October 7, 2003, the number was erroneously mentioned and should be vacated since no Certificate of Correction was granted.

Signed and Sealed this

Fourteenth Day of June, 2005

JON W. DUDAS
*Director of the United States Patent and Trademark Office*